July 21, 1936.  T. E. BOSWORTH  2,047,938
OPHTHALMIC MOUNTING
Filed Nov. 20, 1934
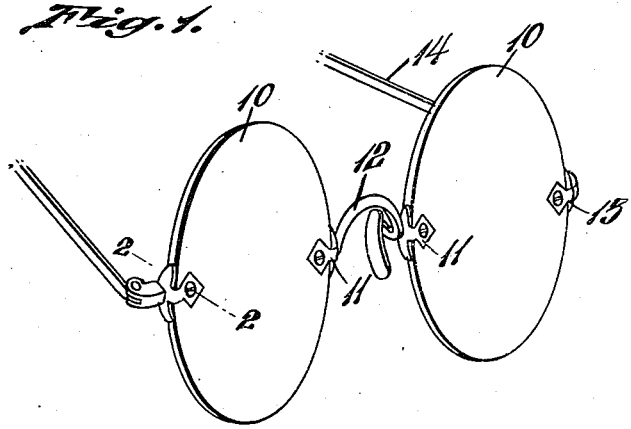
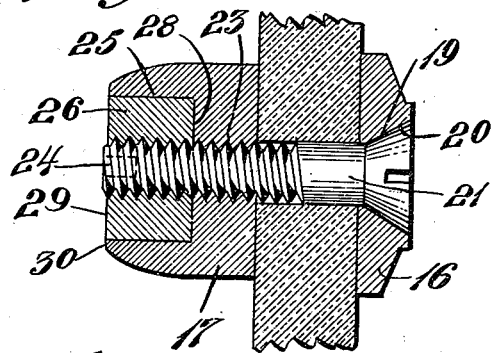
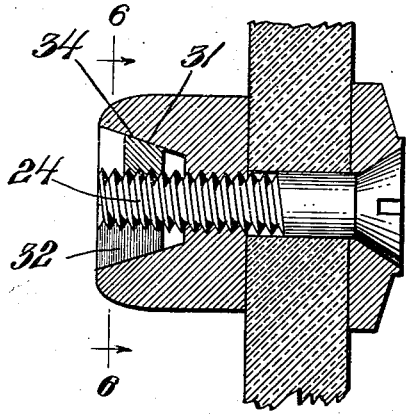
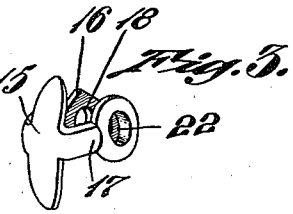
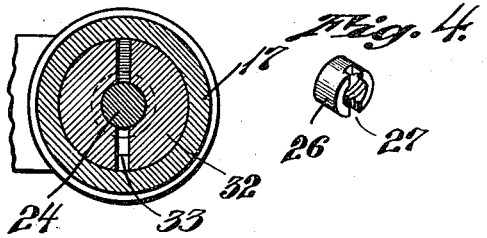
INVENTOR.
Thomas E. Bosworth
BY
Barlow & Barlow
ATTORNEYS.

Patented July 21, 1936

2,047,938

UNITED STATES PATENT OFFICE 2,047,938

OPHTHALMIC MOUNTING

Thomas E. Bosworth, Providence, R. I., assignor to Universal Optical Corporation, a corporation of Rhode Island Application November 20, 1934, Serial No. 753,884

2 Claims. (Cl. 88—47)

This invention relates to an ophthalmic mounting, and has for one of its objects the securing of a strap such as used on rimless lenses in such a manner that the fastening means will not come loose in use.

Another object of the invention is the provision of means for fastening a screw that extends through the lens so that it will not come loose in use and yet may be mechanically removed from its position without resorting to heat, such as when solder is used to secure the screw in place.

Another object of the invention is the provision of means for enclosing a lock nut in one of the arms of the lens straps.

Another object of the invention is to provide a threaded arm with sufficient stock about its threaded opening to completely house a lock nut which may be placed within the stock about this opening.

Another object of the invention is to provide a lock nut with a wedge action for locking it in position on the arm.

With these and other objects in view, the invention consists of certain novel features of construction, as will be more fully described, and particularly pointed out in the appended claims.

In the accompanying drawing:

Fig. 1 is a perspective view of a pair of rimless lenses showing my straps positioned thereon;

Fig. 2 is a sectional view on line 2—2 of Figure 1;

Fig. 3 is a perspective view of one of the lens straps;

Fig. 4 is a perspective view of the lock nut;

Fig. 5 is a sectional view of a modified form of lock nut and arm with a tapered recess;

Fig. 6 is a sectional view on line 6—6 of Figure 5, showing the lock nut.

In the securing of lens straps in position, it is usual to provide a threaded opening in one of the strap arms and then freely pass the threaded screw through the other arm and engage this threaded opening to hold the arms clamped against the lens, and if it is desired to lock the screw in position, a nut is placed on the protruding end of the screw to serve as a check, and in order that this lock nut may be more securely held and also hidden from view, I have thickened up the arm and provided a recess to receive the lock nut by which it may be covered and more securely held in position, and in some cases this lock nut may be tapered and split with a tapered wall formed on the recess in which it seats so as to force the lock nut tightly into engagement with the screw to hold it in position; and the following is a more detailed description of the present embodiment of this invention, illustrating the preferred means by which these advantageous results may be accomplished:

With reference to the drawing, 10 designates the lenses of a spectacle of the rimless type to which there are secured straps 11 at the inner edges for mounting the bridge 12, while at the outer edges straps 13 are provided for mounting the temples 14.

Each of the straps consist of a body portion 15 with a front arm 16 and a rear arm 17. The front arm 16 is provided with an opening 18 having a tapered wall 19 for the reception of the tapered head 20 of the screw 21. The rear arm 17 is provided with an opening 22 which is threaded as at 23 to be engaged by the threads 24 of the screw 21 which tends to bind the arms 16 and 17 into firm engagement with the lens. The arm 17 is thicker than the arm 16 and is provided with a bore or a recess 25 of a depth substantially half the thickness of the arm and of a diameter larger than the threaded opening 23 through this arm. This recess receives a lock nut 26 which is slotted as at 27 for the reception of a turning instrument such as a screw driver or spanner wrench for causing this lock nut to move along the threads 24 of the screw after it has been properly tightened until it bottoms against the shoulder 28 formed between the bore 25 and the threaded bore 23, and as this lock nut is turned into engagement with this shoulder it exerts a pull on the screw and a binding of its threads tightly on the threads of the screw to hold securely in position. The recess 25 is of a depth to completely house the lock nut when this binding action occurs so that its outer surface 29 is flush with the outer surface 30 of the arm.

In some cases I may desire to taper the recess as at 31 in Figure 5, and provide a tapered lock nut 32 which is split as at 33 so that as it is caused to be moved axially by turning upon the threads 24 it will be contracted by reason of its tapered surface 34 engaging the tapered surface 31 of the recess. In this manner the binding action on the threads is one of contraction rather than one of axial pull, although in either case there is provided a secure lock on the screw so as to prevent the screw from moving out of its threaded opening 23 in the arm 17 and a loosening of the arms on the lens.

By this arrangement, not only a secure engagement of the screw and its locking nut is had, but the locking nut is entirely housed and hidden from sight, as well as protected from abuse.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a lens strap having a pair of arms extending along the opposite surfaces of a lens with openings in the arms to align with an opening in the lens, one of said arms having a threaded opening, a threaded pin extending through said openings and engaging said threads, a recess about said threaded opening with walls parallel to the axis of the opening and a bottom at right angles to the walls, and a lock nut having an opening therein with a slot in either side thereof in said recess closely fitting said walls and engaging the said bottom thereof to exert pressure on said bottom and pin.

2. In an ophthalmic mounting, a lens strap having a pair of arms extending along the opposite surfaces of a lens with openings in the arms to align with an opening in the lens, one of said arms having a threaded opening, a threaded pin having a head and extending through said openings and engaging said threads, a recess about said threaded opening with walls parallel to the axis of the opening and a bottom at right angles to the walls, and a lock nut having an opening therein with a slot in either side thereof in said recess closely fitting said walls and engaging said bottom thereof to exert pressure on said bottom and pin, the under side of said head and the opening in the other arm having corresponding tapering fitting surfaces.

THOMAS E. BOSWORTH.